Patented Nov. 14, 1950

2,530,125

UNITED STATES PATENT OFFICE 2,530,125

4-QUINOLYL AMINO COMPOUNDS AND METHOD FOR THEIR PREPARATION

Charles Edward Kwartler, Albany, and Philip Lucas, Menands, N. Y., assignors to Sterling Drug Inc., Wilmington, Del., a corporation of Delaware No Drawing. Application June 29, 1946, Serial No. 680,523

23 Claims. (Cl. 260—286)

This invention relates to new 4-aminoquinoline derivatives having valuable therapeutic properties. More specifically it relates to new 4-(2-(tert-aminoalkyl)-2-(aryl)-ethyl)aminoquinoline derivatives and to a process of preparing the same.

Many 4-(tert-aminoalkyl)aminoquinolines have been prepared as antimalarials; however, none of these compounds already reported in the literature contain an aromatic radical in the side chain linked to the aliphatic residue between the quinoline nucleus and the tertiary amino group. We have now found that this type of quinoline derivative, containing an aromatic radical in said portion of the side chain, not only exhibits antimalarial activity, but also additional desirable properties.

We have found that compounds having the following general formula

Y=N—R—CH(Ar)CH₂NHQ wherein Y=N— is a low molecular tert-amino group, R is an aliphatic bridge, that is, a low molecular divalent aliphatic radical, Rr is an aromatic radical, and Q is a 4-quinolyl radical, are valuable therapeutic agents, showing bactericidal as well as plasmodicidal activity, and specifically show high activity against *Mycobacterium tuberculosis*. This type of compound can be prepared by condensing the appropriate 4-haloquinoline with a 2-(tert-aminoalkyl)-2-(aryl)ethylamine. This condensation is effected by heating the reactants at 130° to 190° C. from 1 to 15 hours.

In the above general formula Y=N— is a tert-amino group derived from a low molecular sec-amine having the general formul Y=NH and containing no active hydrogen atom other than the amino hydrogen, such amines including dimethylamine, diethylamine, dipropylamine, methylbutylamine, piperidine, morpholine, and the like. R is a low molecular divalent aliphatic radical which conveniently may be designated as an aliphatic bridge. The bridge is a chain of from two to seven atoms separating the tert-amino and the arylethylamine residues, and may contain interrupting —O—, —S—, —SO—, —SO₂—, or —N(alkyl)— groups. Thus, R represents such bridges as:

—CH₂CH₂—
—CH₂CH₂CH₂—
—CH₂CH₂CH₂CH₂—
—CH₂CH(CH₃)—
—CH₂CH(C₂H₅)—
—CH₂CH₂OCH₂CH₂—
—CH₂CH₂CH₂SCH₂CH₂CH₂— and the like. Ar is a 1 to 2 ringed carbocyclic aromatic radical, including phenyl, naphthyl and the like. The aromatic radical, represented by Ar, may contain various substituents including: hydrocarbon groups, such as alkyl, aralkyl, aryl, and the like; halogen atoms, such as chlorine, bromine, or iodine; tert-amino groups, such as diethylamino, piperidyl, morpholinyl, and the like; ether groups, such as alkoxy, aryloxy, and the like; or other similar groups which are unaffected by treatment with strong halogenating agents, strong metalating bases, or hydrogen in the presence of hydrogenating catalysts. The aromatic radical, Ar, may also contain other substituents which must be intermediately protected during the preparation of the diamine. For example, the hydroxyl group can be intermediately protected in the form of its ether derivative. Q is a 4-quinolyl radical which may contain various substituents including: halogen atoms, such as chlorine, bromine or iodine; ether groups, such as alkoxy, aryloxy, and the like; hydrocarbon groups, such as alkyl, aralkyl, aryl, and the like; tert-amino groups, such as diethylamino, piperidyl, morpholinyl, and the like; and other such groups which are unreactive to primary amines and strong halogenating reagents.

These compounds can be prepared by condensing a 4-haloquinoline with a 2-(tert-aminoalkyl)-2-(aryl)ethylamine having the formula Y=N—R—CH(Ar)CH₂NH₂ wherein Y=N—, R and Ar have the same meanings specified above. Preparation of these diamine side chains is presented in our copending application, Serial No. 680,524, filed June 29, 1946. Briefly, this preparation involves the alkylation of an arylacetonitrile with a tert-aminoalkyl halide in the presence of a strong metalating base such as sodamide, followed by catalytic hydrogenation of the 1-(tert-aminoalkyl)-1-arylacetonitrile thus formed, according to the following equations:

$$Y=N-R-X + ArCH_2CN \xrightarrow{B} Y=N-R-CH(Ar)CN \xrightarrow{H_2}$$
$$Y=N-R-CH(Ar)CH_2NH_2$$

wherein Y=N— and Ar have the meanings given hereinabove; X is a halogen atom such as chlorine, bromine, or iodine; and B is a strong metalating base such as an alkali amide, an alkali hydride, or the like.

The new quinoline compounds yield neutral colorless or only very slightly colored salts when treated with acids. The salts with hydrohalic acids, sulfuric acid, phosphoric acids or lower organic acids, such as acetic acid, tartaric acid, citric acid, gluconic acid or alkylsulfonic acids are, in general, water-soluble. Salts, which are sparingly soluble or insoluble in water, are obtained with such acids as methylene-bis-2-hydroxy-3-naphthoic acid, 2-hydroxy-3-naphthoic acid, 2,4-dihydroxybenzoic acid, or the like.

In practicing our invention we prefer to use as the diamine component, a 4-diethylamino-2-arylbutylamine or a 5-diethylamino-2-arylpentylamine. For the haloquinoline component we prefer to use the following: 4,7-dichloroquinoline, 4,7-dichloro-3-methylquinoline, or 4,6,8-trichloroquinoline. For Ar, we prefer to use an aromatic monocarbocyclic radical, which we define as an aromatic radical having a benzene nucleus which may bear substituents such as those indicated above.

Our invention may be further understood by reference to the following examples which are presented merely as illustrations, without limiting the scope of our invention thereto.

*Example 1*

7 - chloro - 4-(4-diethylamino-2-phenylbutyl)-aminoquinoline.—A mixture of 25 g. of 4,7-dichloroquinoline, 55.5 g. of 4 - diethylamino-2-phenylbutylamine, and a pinch of potassium iodide is heated at 180° C. for 6 hours. The reaction mixture is dissolved in 125 ml. of 40% acetic acid; and the hot solution is treated with charcoal, filtered, and added dropwise to an excess of cold sodium hydroxide solution. After extraction of this aqueous solution with ether, the ether extract is washed well with water and dried over potassium carbonate. The ether is distilled in vacuo to yield a gummy residue, which is washed well with petroleum ether and dissolved in 50 ml. of benzene. The benzene solution is treated with charcoal and filtered. The filtrate is chilled whereupon crystallization results; the crystals are filtered, washed with cold benzene and petroleum ether, and air dried at 100° C. to yield a white solid melting at 122–4° C. Further recrystallization from benzene, with charcoaling, raises the melting point to 124–5° C. This product is 7-chloro-4-(4-diethylamino-2-phenylbutyl) aminoquinoline.

*Example 2*

7-chloro-4-(2-(4 - chlorophenyl) - 4 - diethylaminobutyl)-aminoquinoline.—A mixture of 19.8 g. of 4,7-dichloroquinoline, 54 g. of 2-(4-chlorophenyl)-4-diethylaminobutylamine, and a pinch of potassium iodide is heated to 180° C., whereupon an exothermic reaction ensues causing the inside temperature to rise to about 198° C. even after removal of the heating bath. After a while the reaction abates and the temperature falls to 180° C., at which point it is maintained for an additional ½ hour. The reaction mixture is worked up like the preceding example, but with the product crystallizing out of the ether extract. One recrystallization from petroleum ether yields a solid melting at 127–9° C. and analyzing satisfactorily for 7-chloro-4-(2-(4-chlorophenyl)-4-diethylaminobutyl) aminoquinoline.

*Example 3*

7 - chloro-4-(2-(3,4-dichlorophenyl)-4-diethylaminobutyl) - aminoquinoline. — This condensation is run like Example 2, but using 19.8 g. of 4,7-dichloroquinoline, 59.5 g. of 2-(3,4-dichlorophenyl)-4-diethylaminobutylamine, and a pinch of potassium iodide. After removal of the ether, the residue is recrystallized from benzene-ether yielding crystalline 7-chloro-4-(2-(3,4-dichlorophenyl) - 4 - diethylaminobutyl) aminoquinoline melting at 111–3° C.

*Example 4*

7 - chloro-4-(4-diethylamino-2-(4 - methoxyphenyl) butyl) -aminoquinoline.—To 90 g. of molten phenol is added 94 g. of 4-diethylamino-2-(4-methoxyphenyl) butylamine and 59.4 g. of 4,7-dichloroquinoline. This mixture is kept at 130–140° C. for 3 hours, dissolved in 375 ml. of 40% acetic acid, and the acidic solution is added dropwise to excess cold sodium hydroxide solution to precipitate an oil which is taken up in ether. After extraction of the ether extract with dilute hydrochloric acid, the acidic aqueous extract is washed with ether, treated hot with charcoal, filtered after making just acid to Congo red with sodium acetate, washed again with ether, and then added to excess aqueous ammonia to precipitate a gum which is taken up in ether. The ether extract is washed with water and saturated sodium chloride solution, dried over potassium carbonate, and chilled to yield 7-chloro-4-(4-diethylamino-2-(4-methoxyphenyl) butyl) aminoquinoline which, after being filtered, washed with cold ether and dried in vacuo over potassium hydroxide and paraffin, weighs about 41 g. and melts at 92–5° C. Recrystallization from ether with charcoaling raises the melting point to 94–96° C.

*Example 5*

7 - chloro-4-(4 - diethylamino-2-(4 - hydroxyphenyl) butyl) aminoquinoline.—30 g. of 7-chloro-4-(4-diethylamino-2-(4 - methoxyphenyl) butyl)-aminoquinoline is dissolved in 450 ml. of 48% hydrobromic acid and refluxed for 15 minutes. After most of the solvent has been distilled off in vacuo, the residue is dissolved in water. This hot aqueous solution is treated with charcoal, filtered, and the filtrate is added to excess aqueous ammonia to precipitate a white solid which is filtered, washed well with water and air dried at 100° C. to yield about 26 g. of 7-chloro-4-(4-diethylamino - 2 - (4-hydroxyphenyl) butyl) aminoquinoline melting at 162–4° C. One recrystallization from 95% ethanol with charcoaling raises the melting point to 163–4° C.

*Example 6*

7-chloro - 4 - (2-(4-chlorophenyl) - 5 - diethylaminopentyl) -aminoquinoline. — This condensation is carried out similarly to Example 4, but using 30 g. of phenol, 34 g. of 2-(4-chlorophenyl)-5-diethylaminopentylamine, 19.8 g. of 4,7-dichloroquinoline, and a pinch of potassium iodide. After adding the acetic acid solution of the reaction mixture to the cold sodium hydroxide solution, the precipitated oil is taken up in ether and the ether extract is washed with 10% sodium hydroxide solution, water and saturated sodium chloride solution. After drying over potassium carbonate, the ether is taken off in vacuo to yield about 29 g. of 7-chloro-4-(2-(4-chlorophenyl)-5 - diethylaminopentyl) aminoquinoline, which, after several recrystallizations from benzene-petroleum ether, weighs about 25 g. and melts at 119.5–21° C.

*Example 7*

7-chloro-4-(4-diethylamino - 2 - phenylbutyl)-amino-3-methylquinoline.—This preparation is run like Example 4, but using a reaction temperature of 180° C. for 15 hours and the following reactants: 30 g. of phenol, 30 g. of 4,7-dichloro-3-methylquinoline, 62.5 g. of 4-diethylamino-2-phenylbutylamine and 25 mg. of sodium iodide. The main fraction of 7-chloro-4-(4-diethylamino-(2-phenylbutyl) amino - 3 - methylquinoline weighing about 40 g. distills about 240° C. and 1 mm.

*Example 8*

7-chloro-4-(2 - (4 - chlorophenyl) - 4 - diethylaminobutyl) -amino - 3 - methylquinoline.—This condensation is carried out like Example 2, but using a reaction time of 6 hours at 180° C. and the following reactants: 60 g. of 2-(4-chlorophenyl)-4-diethylaminobutylamine, 25 g. of 4,7-dichloro-3-methylquinoline and a pinch of sodium iodide. Distillation of the partially purified reaction mixture yields about 18 g. of unreacted diamine and about 44 g. of 7-chloro-4-(2-(4-chlorophenyl) - 4-diethylaminobutyl)amino - 3-methylquinoline distilling about 212° C. and 1 mm.

Example 9

*7-chloro-4-(2-(3,4-dichlorophenyl) - 4 - diethylaminobutyl)amino - 3 - methylquinoline.*—This preparation is carried out like Example 8, but using 52 g. of 2-(3,4-dichlorophenyl) - 4 - diethylaminobutylamine, 15.9 g. of 4,7-dichloro-3-methylquinoline and a pinch of sodium iodide. Distillation of the reaction mixture yields about 16 g. of unreacted diamine and about 24 g. of 7-chloro-4-(2-(3,4-dichlorophenyl) - 4 - diethylaminobutyl)amino - 3-methylquinoline distilling about 260° C. and 0.5 mm.

Example 10

*7-chloro - 4 - (4 - diethylamino - 2 - (4 - methoxyphenyl)butyl) -amino - 3 - methylquinoline.*—This preparation is carried out like Example 8, but using 75 g. of 4-diethylamino-2-(4-methoxyphenyl)-butylamine, 26.5 g. of 4,7-dichloro-3-methylquinoline, and a pinch of sodium iodide. Distillation of the reaction mixture yields about 26 g. of unreacted diamine and about 37 g. of 7-chloro-4-(4-diethylamino - 2 - (4-methoxyphenyl)butyl)-amino - 3 - methylquinoline distilling about 260° C. and 1.5 mm.

The corresponding 4-hydroxyphenyl- and 4-benzyloxyphenyl-derivatives can be prepared in a similar manner by condensing 4,7-dichloro-3-methylquinoline with 4-diethylamino-2-(4-hydroxyphenyl)butylamine and 4-diethylamino-2-(4-benzyloxyphenyl) butylamine, respectively.

Example 11

(a) *4,6,8-trichloroquinoline.*—This quinoline compound is prepared essentially according to the Conrad-Limpach method involving the condensation of 2,4-dichloroaniline with ethyl ethoxalylacetate, and cyclization of the condensate thus formed to yield 2-carbethoxy-6,8-dichloro-4-hydroxyquinoline which is then successively hydrolyzed, decarboxylated and chlorinated resulting in the formation of 4,6,8-trichloroquinoline, M. P. 168-9° C.

(b) *4-(2-(4-chlorophenyl) - 4 - diethylaminobutyl)amino-6,8-dichloroquinoline.*—A mixture of 11 g. of 2-(4-chlorophenyl)-4-diethylaminobutylamine and 5 g. of 4,6,8-trichloroquinoline is heated at 160–70° C. for 3 hours and then at 185–190° C. for an additional 8 hours. After dissolving the reaction mixture in 50 ml. of 50% aqueous acetic acid with warming, 50 ml. of water is added and the resulting solution is charcoaled, filtered, and made alkaline to phenolphthalein, while cooling, with dilute sodium hydroxide solution. The oily solid is extracted with ether; and after the resulting extract is dried over potassium carbonate, the ether is evaporated to yield about 5 g. of crude oily solid. Three recrystallizations of this material from petroleum ether yields light tan crystals melting at 134–6° C. and analyzing satisfactorily for 4-(2-(4-chlorophenyl) - 4 - diethylaminobutyl)amino - 6,8-dichloroquinoline.

Instead of using the particular 4-haloquinolines mentioned hereinabove, other quinolines, such as 4-bromo-2-methylquinoline, 4-chloro-6-methoxyquinoline, and the like may be employed. Also, instead of using the various 2-(tert-aminoalkyl)-2-(aryl)ethylamines mentioned hereinabove, other diamines, such as 2-(2-N-morpholinoethyl)-2-(4-chlorophenyl)ethylamine, 2-(3-N-piperidylpropyl) - 2-(2-naphthyl)ethylamine, and the like, may be employed.

The 4 - (2-tert-aminoalkyl) - 2 - (aryl)ethyl -aminoquinolines have essentially the same therapeutic properties whether employed as the free bases, which are the active components, or—and often more conveniently—as their salts with either inorganic or organic acids; so it will be understood that the free bases and their salts are equivalents with respect to the instant invention.

We claim:

1. A member of the group consisting of a compound having the formula

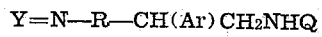

wherein Y=N— is a member of the group consisting of (lower alkyl)$_2$N—, piperidino and morpholino, R is an alkylene group having a chain of 2 to 7 atoms wherein the two free valences of said alkylene group are separated by at least two contiguous carbon atoms, Ar is a member of the group consisting of 1 to 2 ringed carbocyclic aromatic radicals and such said aromatic radicals substituted by members of the group consisting of R'—, R'O—, hydroxyl, halogen and tertiary-amino where R' is a hydrocarbon group selected from the group consisting of alkyl, aryl and aralkyl radicals, and Q is a 4-quinolyl radical and salts thereof.

2. A member of the group consisting of a compound having the formula

where R is an alkylene group having 2 to 7 carbon atoms wherein the two free valences of said alkylene group are separated by at least 2 contiguous carbon atoms, Ar is a phenyl radical and Q is a 4-quinolyl radical and salts thereof.

3. A member of the group consisting of a compound having the formula

where R is an alkylene group having 2 to 7 carbon atoms wherein the two free valences of said alkylene group are separated by at least 2 contiguous carbon atoms, Ar is a halophenyl radical and Q is a 4-quinolyl radical and salts thereof.

4. A member of the group consisting of a compound having the formula

where R is an alkylene group having 2 to 7 carbon atoms wherein the two free valences of said alkylene group are separated by at least 2 contiguous carbon atoms, Ar is a dihalophenyl radical and Q is a 4-quinolyl radical and salts thereof.

5. A process for the preparation of a compound having the formula

wherein Y=N— is a member of the group consisting of (lower alkyl)$_2$N—, piperidino and morpholino, R is an alkylene group having a chain of 2 to 7 atoms wherein the two free valences of said alkylene group are separated by at least two contiguous carbon atoms, Ar is a member of the group consisting of 1 to 2 ringed carbocyclic aromatic radicals and such said aromatic radicals substituted by members of the group consisting of R'—, R'O—, hydroxyl, halogen and tertiary-amino where R' is a hydrocarbon group selected from the group consisting of alkyl, aryl and aralkyl radicals and Q is a 4-quinolyl radical, which comprises condensing a diamine having the formula Y=N—R—CH(Ar)CH₂NH₂ where Y=N—, R, and Ar have the meanings given hereinabove, with a 4-haloquinoline.

6. A process for the preparation of a compound having the formula (lower alkyl)₂N—R—CH(Ar)CH₂NHQ where R is an alkylene group having 2 to 7 carbon atoms wherein the two free valences of said alkylene group are separated by at least 2 contiguous carbon atoms, Ar is a phenyl radical and Q is a 4-quinolyl radical, which comprises reacting a diamine having the formula (lower alkyl)₂N—R—CH(Ar)CH₂NH₂ where R and Ar have the meanings given hereinabove, with a 4-haloquinoline.

7. A process for the preparation of a compound having the formula (lower alkyl)₂N—R—CH(Ar)CH₂NHQ where R is an alkylene group having 2 to 7 carbon atoms wherein the two free valences of said alkylene group are separated by at least 2 contiguous carbon atoms, Ar is a halophenyl radical and Q is a 4-quinolyl radical, which comprises reacting a diamine having the formula (lower alkyl)₂N—R—CH(Ar)CH₂NH₂ where R and Ar have the meanings given hereinabove, with a 4-haloquinoline.

8. A process for the preparation of a compound having the formula (lower alkyl)₂N—R—CH(Ar)CH₂NHQ where R is an alkylene group having 2 to 7 carbon atoms wherein the two free valences of said alkylene group are separated by at least 2 contiguous carbon atoms, Ar is a dihalophenyl radical and Q is 4-quinolyl radical, which comprises reacting a diamine having the formula (lower alkyl)₂N—R—CH(Ar)CH₂NH₂ where R and Ar have the meanings given hereinabove, with a 4-haloquinoline.

9. A member of the group consisting of a compound having the formula (lower alkyl)₂N—R—CH(Ar)CH₂NHQ where R is an alkylene group having 2 to 7 carbon atoms wherein the two free valences of said alkylene group are separated by at least 2 contiguous carbon atoms, Ar is an alkoxyphenyl radical and Q is a 4-quinolyl radical and salts thereof.

10. A member of the group consisting of a compound having the formula (lower alkyl)₂N—R—CH(Ar)CH₂NHQ where R is an alkylene group having 2 to 7 carbon bon atoms wherein the two free valences of said alkylene group are separated by at least 2 contiguous carbon atoms, Ar is a hydroxyphenyl radical and Q is a 4-quinolyl radical and salts thereof.

11. A member of the group consisting of 7-chloro-4-(2-(4-methoxyphenyl)-4-diethylaminobutyl)aminoquinoline and salts thereof.

12. A member of the group consisting of 7-chloro-4-(2-(4-hydroxyphenyl)-4-diethylaminobutyl)aminoquinoline and salts thereof.

13. A process for the preparation of a compound having the formula (lower alkyl)₂N—R—CH(Ar)CH₂NHQ where R is an alkylene group having 2 to 7 carbon atoms wherein the two free valences of said alkylene group are separated by at least 2 contiguous carbon atoms, Ar is an alkoxyphenyl radical and Q is a 4-quinolyl radical, which comprises reacting a diamine having the formula (lower alkyl)₂N—R—CH(Ar)CH₂NH₂ where R and Ar have the meanings given hereinabove, with a 4-haloquinoline.

14. A process for the preparation of 7-chloro-4-(2-(4-methoxyphenyl)-4-diethylaminobutyl)aminoquinoline which comprises condensing 2-(4-methoxyphenyl)-4-diethylaminobutylamine with 4,7-dichloroquinoline.

15. A member of the group consisting of 7-chloro-4-(2-(4-chlorophenyl)-4-diethylaminobutyl)aminoquinoline and salts thereof.

16. A member of the group consisting of 7-chloro-4-(2-(3,4-dichlorophenyl)-4-diethylaminobutyl)amino-3-methylquinoline and salts thereof.

17. A member of the group consisting of 4-(2-(4-chlorophenyl)-4-diethylaminobutyl)amino-6,8-dichloroquinoline and salts thereof.

18. A process for the preparation of 7-chloro-4-(2-(4-chlorophenyl)-4-diethylaminobutyl)aminoquinoline which comprises condensing 2-(4-chlorophenyl)-4-diethylaminobutylamine with 4,7-dichloroquinoline.

19. A process for the preparation of 7-chloro-4-(2-(3,4-dichlorophenyl)-4-diethylaminobutyl)amino-3-methylquinoline which comprises condensing 2-(3,4-dichlorophenyl)-4-diethylaminobutylamine with 4,7-dichloro-3-methylquinoline.

20. A process for the preparation of 4-(2-(4-chlorophenyl)-4-diethylaminobutyl)amino-6,8-dichloroquinoline which comprises condensing 2-(4-chlorophenyl)-4-diethylaminobutylamine with 4,6,8-trichloroquinoline.

21. A compound according to claim 1 where Q is 7-chloro-4-quinolyl.

22. A compound according to claim 1 where Q is 7-chloro-3-methyl-4-quinolyl.

23. A compound according to claim 1 where Q is 6,8-dichloro-4-quinolyl.

CHARLES EDWARD KWARTLER.
PHILIP LUCAS.

REFERENCES CITED

The following references are of record in the file of this patent:

UNITED STATES PATENTS

| Number | Name | Date |
|---|---|---|
| 2,233,970 | Andersag et al. | Mar. 4, 1941 |

OTHER REFERENCES

Mosher: "Antimalarials: Natural and Synthetic" (Edwards Bros. Inc., Ann Arbor, Mich.; 1942) pp. 27 and 36–46.

Malaria Report #365; March 23, 1945, pp. 1 and 21, 18–35. (Published as PB report 76, 839.)

Wiselogle, "Survey of Antimalarial Drugs 1941–1945," vol. II, pp. 1151, 1153, 1154 and 1214 (J. W. Edwards, Ann Arbor, Mich., 1946).

Certificate of Correction

Patent No. 2,530,125                                                         November 14, 1950

CHARLES EDWARD KWARTLER ET AL.

It is hereby certified that error appears in the printed specification of the above numbered patent requiring correction as follows:

Column 1, line 24, for "Rr" read *Ar*; line 37, for "formul" read *formula*; column 2, line 41, for that portion of the equation reading "NH²" read *NH₂*; column 4, line 66, for "amino-(2-" read *amino-2-*; column 5, line 38, for "benzyloxyphenyl) butylamine" read *benzyloxyphenyl)butylamine*; column 7, line 63, strike out the syllable "bon";

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*